LONG-PERIOD RELAXATION OSCILLATOR

Filed June 19, 1961

*INVENTOR.*
ROBERT ALAN MAMMANO
*BY*

ATTORNEY 3,074,028
LONG-PERIOD RELAXATION OSCILLATOR

Robert A. Mammano, Costa Mesa, Calif., assignor to the United States of America as represented by the Secretary of the Navy Filed June 19, 1961, Ser. No. 118,198
6 Claims. (Cl. 331—111)
(Granted under Title 35, U.S. Code (1952), sec. 266)

The invention described herein may be manufactured and used by or for the Government of the United States of America for governmental purposes without the payment of any royalties thereon or therefor.

This invention relates to a relaxation oscillator circuit utilizing semi-conductor devices and more particularly to such a circuit which provides regularly repeated timing pulses and has special utility in connection with the programming of long flight missiles and space vehicles. The improvement of the present invention relates more particularly to a circuit capable of providing relatively long pulse repetition periods, such as pulse repetition periods in the order of one second or one minute.

For purposes of this specification, a "relaxation oscillator circuit" is defined as an oscillator whose frequency of oscillations is determined by the time of charging a capacitor through a resistor. When used to provide timing pulses such circuit provides one pulse for every cycle of its operation. "Pulse repetition period" is defined as the time required to complete one cycle.

Relaxation oscillators which employ semi-conductor devices are well known. In the type most widely used in the prior art the capacitor discharges through an initially non-conductive unijunction transistor. The circuit arrangement is such that the unijunction device is rendered conductive when the voltage across the charging capacitor increases to a predetermined "turn on" value of the unijunction, providing a discharge path for the capacitor. It then reverts to its non-conducting condition when the potential across the capacitor drops to a "turn-off" value of the unijunction, which is somewhat above the fully discharge condition of the capacitor. Circuits of this type find use in the medium or high frequency range above 100 cycles per second.

The accuracy and stability of semi-conductor relaxation oscillators at lower frequencies, and in particular in the very low frequency range in which the pulse repetition period is in the order of 1 second to 1 minute, has been a serious problem, prior to the present invention, because of the inability of the semi-conductor devices to completely discharge the charging capacitor, the considerable sensitivity of semi-conductor devices to temperature changes and their low peak current capacity. Lacking accuracy and circuit stability in this range, it heretofore has been considered necessary to employ an elaborate frequency dividing or counting network in conjunction with a medium or high frequency oscillating unit in order to obtain these very low frequencies.

Solution of the aforesaid problem has been made more difficult because of the extremely large changes in temperature, which the oscillator may be subjected to in some of its intended usages. For example, when the oscillator is used in aircraft launched long flight missiles, the temperature of the unit may vary between −50° F., while externally carried by the launching plane at high altitudes, to +150° F. during the missile flight. An example of such environment is disclosed in U.S. patent application of Firth Pierce, Serial No. 77,478, filed December 21, 1960, wherein the present invention may be employed to provide long term timing pulses to program events in a satellite launching vehicle.

A prior approach for solving this problem was to vary the magnitude of the elements upon which the time of charging the capacitor depends. It is known that the rate at which a capacitor charges and in turn the period of the oscillator depends principally on the product of two quantities: (1) the resistance of the charging circuit including a charging resistor provided for the specific purposes of limiting the charging rate, and (2) the capacitance of the capacitor taking the charge. It turns out that in all practicable circuit arrangements the capacitor is parallel with certain internal leakage paths of the semi-conductor device. This approach is therefore severely limited by the requirement that the magnitude of the charging resistor be appreciably smaller than the leakage resistance of the semi-conductor device, so that the fluctuation of the leakage resistance under changes in temperature will not cause appreciable changes in charging time. Accordingly, beyond a certain point the period of the oscillator can only be increased by increasing the magnitude of the capacitor. However, this requires a larger load resistor in the discharge path to prevent exceeding the peak current rating of the semi-conductor device, which larger resistor adversely affects circuit stability under temperature changes.

The problem is further aggravated by the fact the unijunction device cannot fully discharge the capacitor, with the consequent failure of the capacitor to start from the zero potential point in charging cycles subsequent to the first charging cycle. This causes the first cycle to be larger than subsequent cycles. More importantly, however, the potential magnitude at which the unijunction "turns off" is itself temperature sensitive, and this tends to cause appreciable variations in frequency under changing temperatures.

What was needed was a way to short circuit the charging capacitor to fully discharge it at the appropriate time in the cycle. This approach has been used to achieve similar results in prior art relaxation oscillator circuits employing electronic tubes. For the tube oscillator circuits the requirements of this approach are generally readily obtainable because the tubes have high input impedances. However, the requirements are not easily obtainable in the case of semi-conductors for a number of reasons, including the low input and output impedances of these devices, their sensitvity to temperature, and the difficulty of deriving an output of sufficient energy to reliably trigger the utilization circuit.

As distinguished from these and other unsuccessful prior attempts, the principal objects of the invention are:

(1) To provide a semi-conductor relaxation oscillator capable of accurate operation at very low frequencies of operation;

(2) To provide a semi-conductor relaxation oscillator as aforesaid which exhibits good circuit stability under wide variations of temperature;

(3) To provide a semi-conductor relaxation oscillator in which provision is made to cause the charging condenser to start each charging cycle from substantially the same point;

(4) To provide a very low frequency semi-conductor relaxation oscillator which reliably triggers a utilization circuit; and (5) To provide a semi-conductor timing device in which a long term timing pulse is produced by a single unit without need for auxiliary frequency dividing or counting circuits.

Other objects and many of the attendant advantages of this invention will be readily appreciated as the same becomes better understood by reference to the following detailed description when considered in connection with the accompanying drawings wherein.

Figure 1:
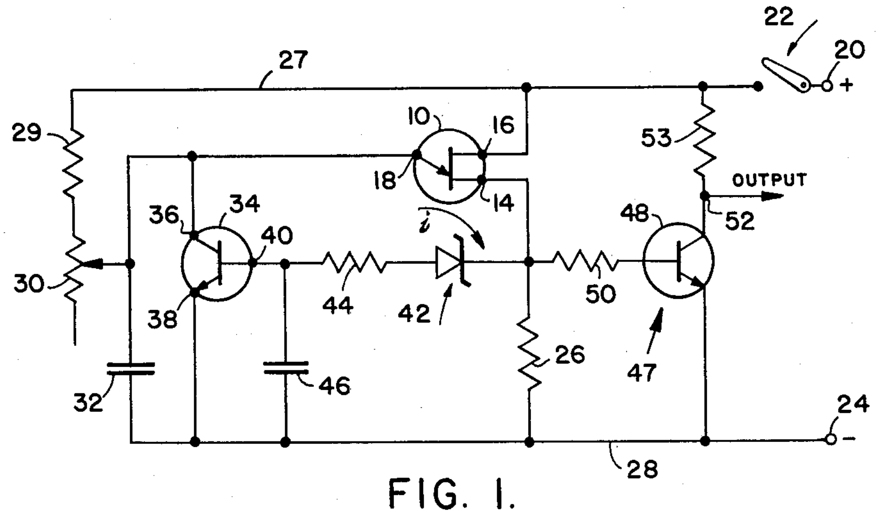
FIG. 1 is a schematic diagram of a circuit embodying the present invention.
Figure 2:
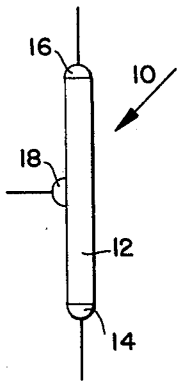
FIG. 2 is a diagrammatic representation of the physical structure of the unijunction device of FIG. 1.

Referring now to FIG. 1 of the drawing, a relaxation oscillator circuit includes a conventional unijunction transistor device 10 which, as well understood in the art, comprises a semi-conductive body 12, FIG. 2, of one type of semi-conductive material, such as N-type material. A pair of bilateral conductive ohmic contacts are joined to body 12 in spaced relationship to one another, consisting of base-one contact 14 and a base-two contact 16. Joined to body 12 intermediate contacts 14 and 16 is a rectifying contact or emitter 18. A power supply has a positive terminal 20 connected to base-two 16 of the unijunction device through a switch 22 and has a negative terminal 24 connected to base-one 14 of the unijunction device through a pulse voltage forming or load resistor 26. Connected between a positive supply line 27 connected to terminal 22 and a negative supply line 28 connected to terminal 24, is a resistance capacitance network comprising a fixed charging resistor 29, a trimmer or variable resistor 30 and a storage or time integrating capacitor 32. The junction of resistor 30 and capacitor 32 is connected to emitter 18 of unijunction device 10. The circuit thus far described constitutes one form of basic circuit arrangement of unijunction relaxation oscillator, heretofore known in the art, in which the charge on capacitor 32 is periodically discharged through the unijunction internal circuit path between emitter 18 and base-one 14, with conventional current flow in the direction of arrow *i*.

As employed in this circuit unijunction device 10 acts as a switching device. It is a characteristic of this device that it is in a state of non-conduction with essentially no current flowing from its emitter 18 to base-one contact 14, until the potential between emitter 18 and base-one contact 14 rises to a predetermined "turn on value," which is a certain percentage of the potential between base-two 16 and base-one 14. Upon rising to the turn on value, the unijunction is rendered conductive and current readily flows from emitter 18 to base-one 14. There is a small steady-state current which flows between base-two 16 and base-one 14 but it has no effect upon the circuit except as subsequently described. Thus the charge on capacitor 32, which through resistor 26 is connected between emitter 18 and base-one 14, controls the state of conduction of unijunction device 10 and renders it conductive when the charge is built up to the turn on value. Once the unijunction device is rendered conductive it remains in this condition even after commencement of a decline in potential between emitter 18 and base-one 14, until this potential drops to a "turn off" value which is much lower than the turn on value, but somewhat above a zero potential value. Upon dropping to the turn off value the unijunction device reverts to its non-conductive condition.

Operatively associated with this basic oscillator circuit arrangement is a normally non-conductive switching transistor 34 having its current carrying terminals, consisting of a collector 36 and an emitter 38, connected across capacitor 32, and having a control terminal or base 40. Transistor 34, which may be of the NPN type as shown, is chosen to become conductive in response to a relatively low forward bias applied between its base and emitter and to exhibit collector saturation at relatively low potentials across its collector and emitter. Connected in parallel with pulse forming resistor 26 from base-one 14 to the negative supply line 28 is a series network consisting of a conventional Zener diode 42 poled with its cathode connected to base-one 14, a charging or delay resistor 44, and a storage capacitor 46. Base 40 of transistor 34 is connected to the junction between resistor 44 and capacitor 46.

As is understood in the art, a characteristic of the Zener type diode 42 is that it is non-conductive in the direction from its cathode to its anode, termed its "reverse direction," until a predetermined magnitude of reverse potential is applied across it, called the "Zener voltage"; whereupon, it is rendered conductive in the reverse direction. Thus, it in effect provides an open circuit in the series network of diode 42, resistor 44 and capacitor 46 when the potential at the junction between base-one 14 and resistor 26 is less than the Zener voltage and closes the circuit when the potential at the junction is equal to or more than the Zener voltage. In this manner the series network of resistor 44 and capacitor 46 is isolated from potentials across resistor 26 due to the small interbase current through unijunction device 10. This current varies appreciably under changes in temperature, and in absence of the Zener diode could charge capacitor 46 sufficiently to turn transistor 34 on.

Operatively connected to the oscillator unit is pulse amplifier stage 47 including an NPN transistor 48 having its base connected to base-one contact 14 of unijunction 10 through a resistor 50. This stage inverts and amplifies the voltage across resistor 26, providing its output between a terminal 52 connected to the collector of transistor 48, and the negative supply line 28. This stage also serves as a buffer to the load.

Figure 3:
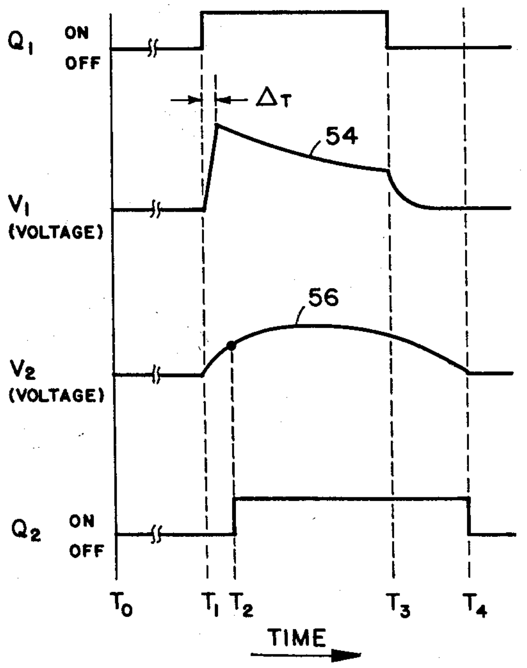
FIG. 3 shows a family of graphs of the voltages and conditions of conduction at various points in the circuit of FIG. 1.

In describing the operation of the circuit of FIG. 1, reference is made to FIG. 3 wherein the abscissa represents time not drawn to scale. Graph $Q_1$ is a schematic representation of the state of conduction of unijunction transistor 10; curve $V_1$ is taken by measuring the potential across resistor 26; curve $V_2$ is taken by measuring the potential across capacitor 46, and graph $Q_2$ is a schematic representation of the state of conduction of transistor 34.

In operation, upon closing switch 22, at a time $T_0$, the supply source is applied between base-one 14 and base-two 16 through resistor 26, and across the resistance capacitance network of resistors 29, 30 and capacitor 32. Capacitor 32 commences to charge and eventually, at a time $T_1$, the charge on the capacitor rises to the turn-on value of unijunction device 10 rendering it conductive, as shown by graph $Q_1$. Capacitor 32 then discharges through a series path comprising emitter 18 and base-one 14 of unijunction device 10 and resistor 26. This current produces a pulse 54, of curve $V_1$. The leading edge of pulse 54 rises very steeply, having a very slight rise time $\Delta t$, which is in the order of several microseconds. The potential at the end of resistor 26 connected to the cathode of Zener diode 42 becomes positive in excess of the Zener voltage, which renders Zener diode 42 conductive in its reverse direction which permits current to flow in the resistance-capacitance network of resistor 44 and capacitor 46, causing a pulse 56, of curve $V_2$, to appear across capacitor 46. At a time $T_2$, shortly after $T_1$, the charge across capacitor 46 becomes sufficient to forward bias transistor 34 and transistor 34 is turned on, as shown by graph $Q_2$. With both unijunction 10 and transistor 34 turned on, capacitor 32 has two discharge paths and the potential across capacitor 32 decays exponentially and this decay reflects itself in the decay of pulse 54. Eventually, at a time $T_3$, pulse 54 decays to turn-off value of unijunction 10 and it reverts to its non-conductive state.

However, the charge stored in capacitor 46 at the time the unijunction is turned off maintains transistor 34 conductive to continue discharging capacitor 32 until it is substantially completely discharged. Finally at time $T_4$ the charge on capacitor 46 decays to the point where transistor 34 is no longer forward biased and both unijunction 10 and transistor 34 are non-conductive so that the conditions at the beginning of the cycle exist once more. The cycle repeats itself in the same manner as long as switch 22 is closed.

The following facts in connection with the resistance capacitance circuit consisting of resistor 44 and capacitor 46 should be noted. First, the values of the resistor and capacitor are such that the rise time of pulse 56 is slow compared to the rise time $\Delta t$ of pulse 54, which minimizes the loading of pulse 54 and thereby optimizes output energy of the circuit. Second, the values are such that the charge stored in capacitor 46 is sufficient to hold transistor 34 in strong conduction at time $T_3$ when unijunction 10 is turned off.

Pulse 54 is superimposed on the operating potential at the base of pulse amplifier transistor 48, providing a relatively higher level pulse at terminal 52 which constitutes the timing pulse output of the circuit. The actual length of pulse 54 is a very small fraction of the period of the oscillator. For instance the length of pulse 54 may be in the order of several one thousandths of a second in an oscillator having a period of 1 second to 1 minute. The pulse repetition period of the time pulse is essentially determined by the values of resistor 29, resistor 30 and capacitor 32. Resistor 30 is adjustable to permit fine control of the pulse repetition period.

It is to be noted that transistor 34 causes capacitor 32 to be discharged to a potential very near zero. Thus the difference between the time period of the first charging cycle and subsequent charging cycles is substantially eliminated. Elimination of this variation assists in stabilizing the circuit under changes in temperature because the voltage to which capacitor 32 is discharged by transistor 34 is an extremely small percentage of the total voltage charge, so any variation in this voltage due to temperature variation will have a negligible effect on the overall accuracy. Also, action of transistor 34 provides a second low impedance discharge path for capacitor 32 so that a considerable portion of the energy stored in capacitor 32 is by-passed around unijunction 10. In many instances the value of resistor 26 is limited by the peak current carrying capabilities of unijunction 10 and the effect of the second discharge path is to permit use of a lower value of resistor 26, which is conducive to providing a higher energy and more reliable output pulse.

The advantages of a relaxation osciallator in accordance with the present invention are readily apparent. These include:

(1) Ability to provide accurate long period oscillations by means of low power semi-conductor circuitry. In experiments the oscillator operated at a pulse repetition period of 25 seconds with an accuracy within one percent. Heretofore accurate oscillations at periods longer than 1/10 second were thought difficult to achieve.

(2) Circuit stability under wide temperature changes. In experiments a 25 second period of oscillation was maintained within an accuracy ±1 second under a change of ambient temperature from −50° F. to +200° F.

(3) Substantial elimination of the difference between the time period of the first cycle of operation and subsequent cycles of operation.

(4) Ability to provide high energy output pulses.

The following circuit specifications are included by way of an example only, to provide a circuit for producing timing pulses at a pulse repetition period of 25 seconds.

| | |
|---|---|
| Unijunction **10** | Type 2N489. |
| Transistor **34** | Type 2N552. |
| Transistor **48** | Type 2N471A. |
| Zener diode **42** | Type 1N465. |
| Resistor **26** | 200 ohms. |
| Resistor **29** | 120K ohms. |
| Resistor **30** | 50K ohms. |
| Resistor **44** | 82 ohms. |
| Resistor **50** | 56K ohms. |
| Resistor **53** | 8.2K ohms. |
| Capacitor **32** | 130 microfarads. |
| Capacitor **46** | 70 microfarads. |

Obviously many modifications and variations of the present invention are possible in the light of the above teachings. It is therefore to be understood that within the scope of the appended claims the invention may be practiced otherwise than as specifically described.

What is claimed is:

1. A timing device for providing electrical impulses comprising; a first time integrating capacitor and an associated circuit for charging same at a predetermined charging rate, a first normally cut off semi-conductor switching device operable to provide a first discharge path across the time integrating capacitor upon the charge thereacross reaching a first predetermined magnitude, an output load impedance across which said electrical impulses are developed during capacitor discharge, said load impedance being series connected in said first discharge path, a second normally cut off semi-conductor switching device actuable to provide a second discharge path across said first capacitor, and means for deriving a signal for actuating said second switching device from the output pulse developed across said output impedance.

2. Apparatus in accordance with claim 1 wherein said first switching device is a unijunction transistor having an emitter and a base forming a portion of said first discharge path, said first switching device being of such nature that it reverts to cut off condition upon the charge across the capacitance dropping to a second predetermined level, said means for deriving a signal including storage means to maintain the second switching device conductive after the first switching device is cut off.

3. Apparatus in accordance with claim 1 wherein said means for deriving a signal comprises means to delay actuation of the second switching device after initiation of discharge of the capacitor through the first discharge path.

4. Apparatus in accordance with claim 1 wherein said means for deriving a signal comprises means for isolating said second device from changes in potential across said load resistor resulting from temperature change of the first device.

5. Apparatus in accordance with claim 1, said second switching device having a control input, a network connected across said output load impedance comprising a serially connected resistor and a second capacitor, said control input connected across said second capacitor.

6. Apparatus in accordance with claim 5, said network including voltage response means serially connected with the resistor and capacitor for preventing charging of said second capacitor unless the potential across said load impedance exceeds a predetermined value.

No references cited.